United States Patent
Chung

(10) Patent No.: US 7,028,515 B2
(45) Date of Patent: Apr. 18, 2006

(54) BURGLARPROOF LOCKING DEVICE FOR A VEHICLE

(75) Inventor: Jin-Sang Chung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 350 days.

(21) Appl. No.: 10/331,239

(22) Filed: Dec. 30, 2002

(65) Prior Publication Data

US 2003/0233857 A1 Dec. 25, 2003

(30) Foreign Application Priority Data

Jun. 20, 2002 (KR) .................. 10-2002-0034573

(51) Int. Cl.
*B60R 25/02* (2006.01)

(52) U.S. Cl. ........................................ 70/186; 70/252

(58) Field of Classification Search ........... 70/182–187, 70/252

See application file for complete search history.

(56) References Cited

U.S. PATENT DOCUMENTS

| | | | | |
|---|---|---|---|---|
| 3,680,656 A | * | 8/1972 | Leger | 180/287 |
| 3,688,861 A | * | 9/1972 | Lipschultz et al. | 180/287 |
| 3,782,493 A | * | 1/1974 | Lipschutz et al. | 180/287 |
| 3,887,029 A | * | 6/1975 | Lipschutz et al. | 180/287 |
| 4,119,171 A | * | 10/1978 | Remontet | 180/287 |
| 4,266,414 A | | 5/1981 | Eichenauer | 70/252 |
| 4,332,306 A | * | 6/1982 | Turatti | 180/287 |
| 4,581,909 A | | 4/1986 | Weber | 70/186 |
| 4,584,856 A | | 4/1986 | Petersdorff et al. | 70/57 |
| 4,598,933 A | | 7/1986 | Hoelzl | 280/809 |
| 4,630,456 A | | 12/1986 | Nielsen, Jr. | 70/232 |
| 4,797,538 A | | 1/1989 | Schick | 235/10 |
| 4,798,067 A | | 1/1989 | Peitsmeier et al. | 70/252 |
| 4,854,142 A | | 8/1989 | Peitsmeier et al. | 70/186 |
| 5,136,284 A | * | 8/1992 | Kitamura | 340/5.22 |
| 5,152,358 A | | 10/1992 | Kozuka | 180/78 |
| 5,216,908 A | | 6/1993 | Malvy | 70/218 |
| 5,255,547 A | * | 10/1993 | Burr et al. | 70/252 |
| 5,641,999 A | * | 6/1997 | Kawashima | 307/10.3 |
| 5,656,867 A | * | 8/1997 | Kokubu | 307/10.5 |
| 6,000,489 A | * | 12/1999 | Rick | 180/287 |
| 6,298,938 B1 | * | 10/2001 | Klaiber et al. | 180/287 |
| 6,354,117 B1 | | 3/2002 | Canard | 427/98 |
| 6,354,120 B1 | * | 3/2002 | Tan et al. | 70/252 |
| 6,380,642 B1 | * | 4/2002 | Buchner | 307/10.3 |
| 6,508,088 B1 | * | 1/2003 | Barbier et al. | 70/186 |
| 6,516,640 B1 | * | 2/2003 | Jacobs et al. | 70/186 |

FOREIGN PATENT DOCUMENTS

| | | |
|---|---|---|
| DE | 198 42 224 A1 | 4/2000 |
| DE | 199 57 624 A1 | 8/2001 |
| DE | 100 55 361 A1 | 5/2002 |
| EP | 0 846 820 A1 | 6/1998 |

* cited by examiner

*Primary Examiner*—John B. Walsh
(74) *Attorney, Agent, or Firm*—Morgan Lewis & Bockius LLP

(57) ABSTRACT

An improved burglarproof locking device for a vehicle is disclosed. The locked status of the locking device is not released by a strong impact or by an external magnetic force, thereby preventing the car from being stolen. Thus the reliability of the locking device is improved.

13 Claims, 7 Drawing Sheets

BURGLARPROOF LOCKING DEVICE FOR A VEHICLE

FIELD OF THE INVENTION

The present invention relates to a device for burglarproofing a vehicle. More particularly, the present invention relates to a burglarproof locking device for the ignition and the steering column of a vehicle.

BACKGROUND OF THE INVENTION

Generally, burglarproof or burglar deterrent devices for vehicles include door-locking devices and mechanical locking mechanism associated with the steering column. The mechanical locking mechanism associated with the steering column generally locks the steering shaft of the steering column. This type of mechanism is typically activated and deactivated by the insertion of the key into the ignition.

Typical steering column locking devices comprise a housing that contains the locking components. Within the housing is an electromagnet controlled by a solenoid. Also included is an actuator that has locking tabs that interact with locking slots in the housing. When the actuator's locking tabs engage the locking slots in the housing the ignition and the steering column are withheld from turning. When the proper key is inserted into the ignition and turned, the solenoid produces a signal that activates the electromagnet. The electromagnet attracts an actuator, which in turn pulls the locking tabs out of the locking slots defined in the housing and releases the ignition and the steering column from being locked.

However, there are several drawbacks with the conventional steering and ignition locking device. A strong magnet can be utilized, externally to the steering column, to move the actuator from its locked position. Furthermore, the application of a heavy impact to the conventional locking device can cause the actuator to move, releasing the locked state of the steering column and the ignition.

SUMMARY OF THE INVENTION

The present invention provides an improved burglarproof locking device for a vehicle. The locked status of the locking device of the present invention is unaffected by a strong impact or by an external magnetic force, thereby reducing car theft.

In accordance with an embodiment of the present invention, a locking device includes a locking housing part with a locking slot formed therein. Also included is an actuator with a locking tab. The locking tab mates with a locking slot. The actuator moves in an unlocking axial direction by a magnetic force generated by an electromagnet and moves in a locking axial direction by the force of a spring. The locking device further includes a locking block axially displaceable and installed within the locking housing part. The locking block restricts rotation of the actuator. Furthermore, an elastic member is included to elastically separate the locking block from the actuator to facilitate rotation of the ignition and steering column.

BRIEF DESCRIPTION OF THE DRAWINGS

For fuller understanding of the nature and objects of the present invention, reference should be made to the following detailed description in conjunction with the accompanying drawings in which.

DETAILED DESCRIPTION OF THE PREFERRED EMBODIMENT

Figure 1:
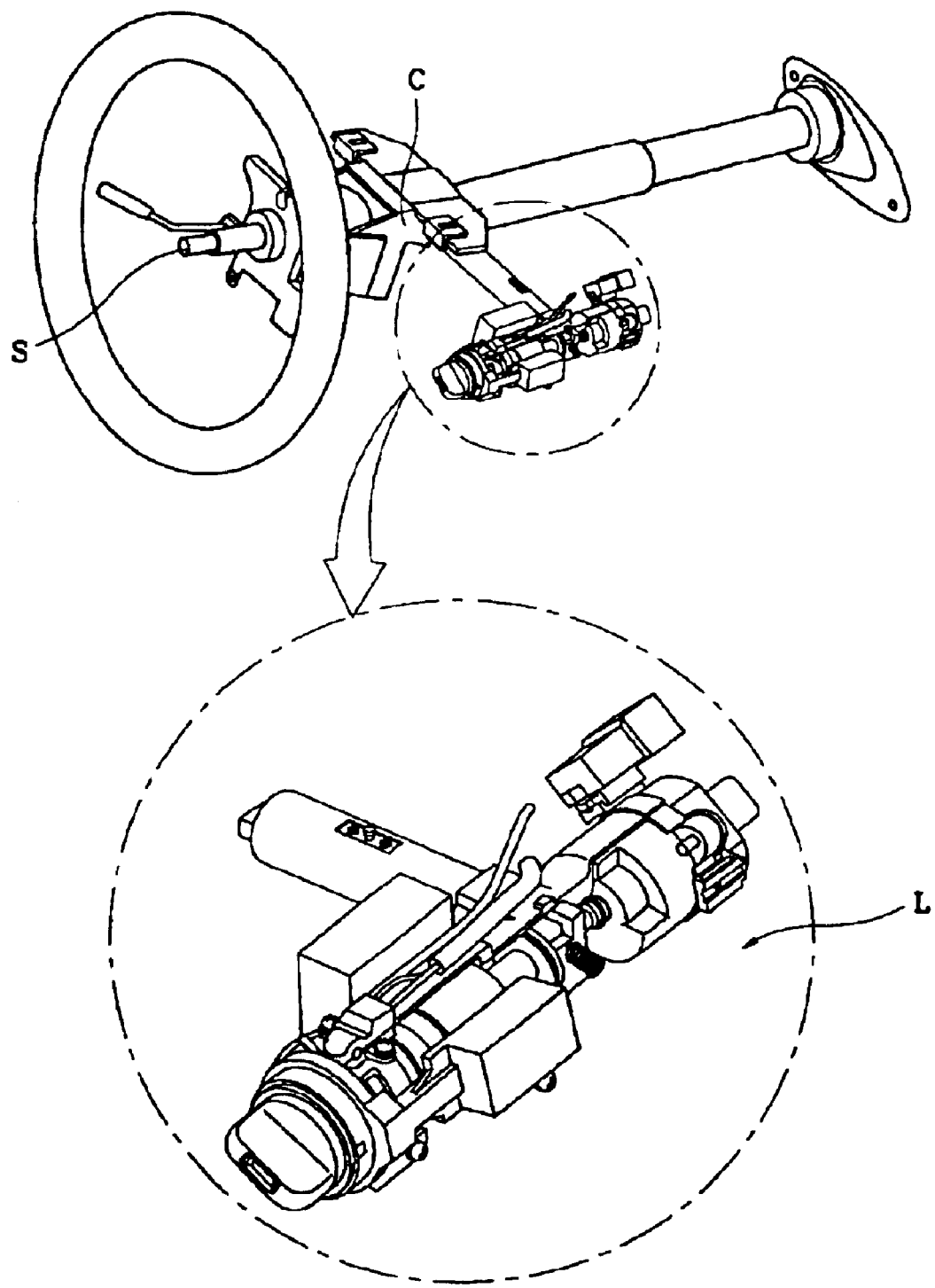
FIG. 1 is a perspective view of an embodiment of a locking device located on a steering column according to an embodiment of the present invention.
Figure 2:
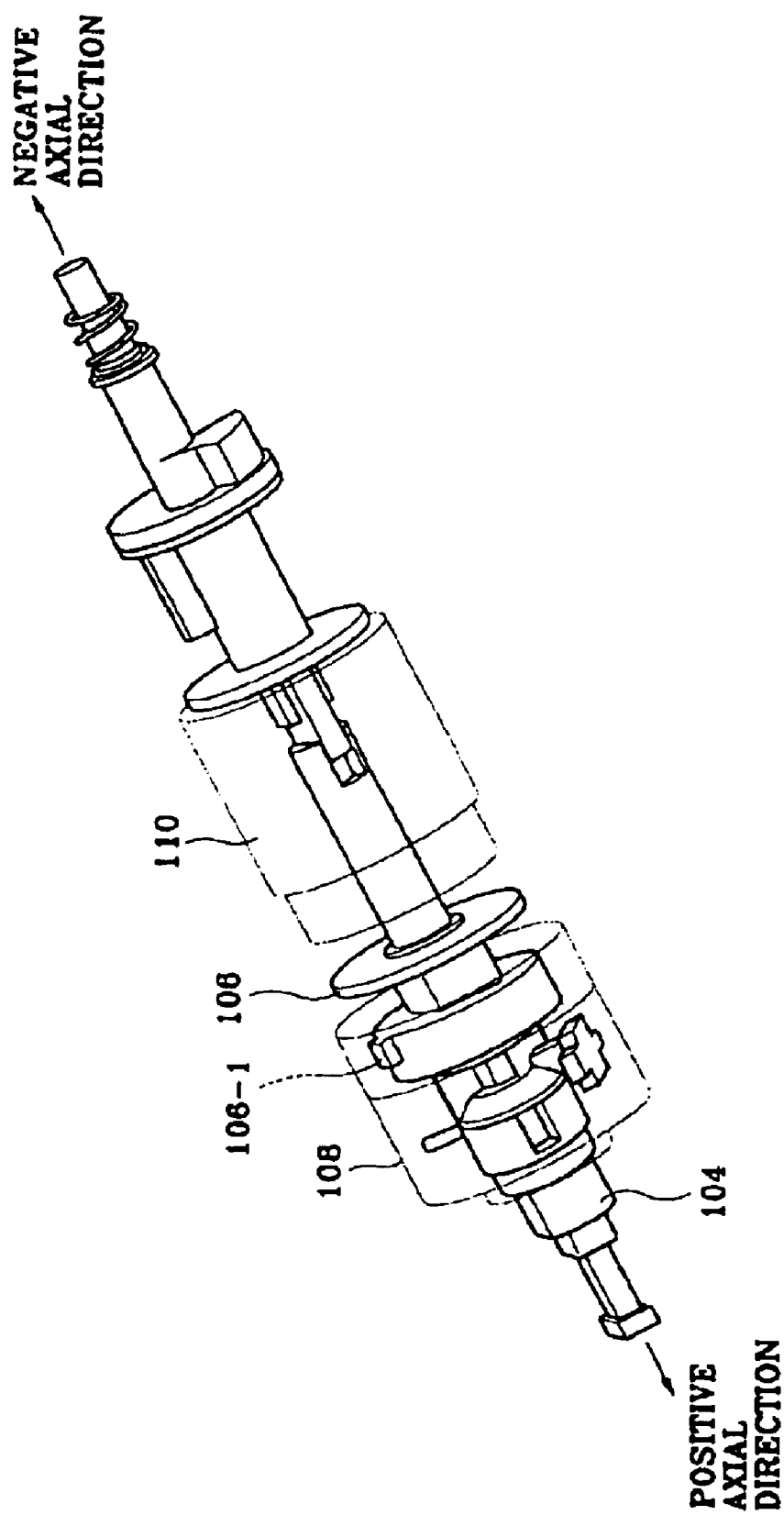
FIG. 2 shows the coupling of the internal components of the locking device of FIG. 1.
Figure 3:
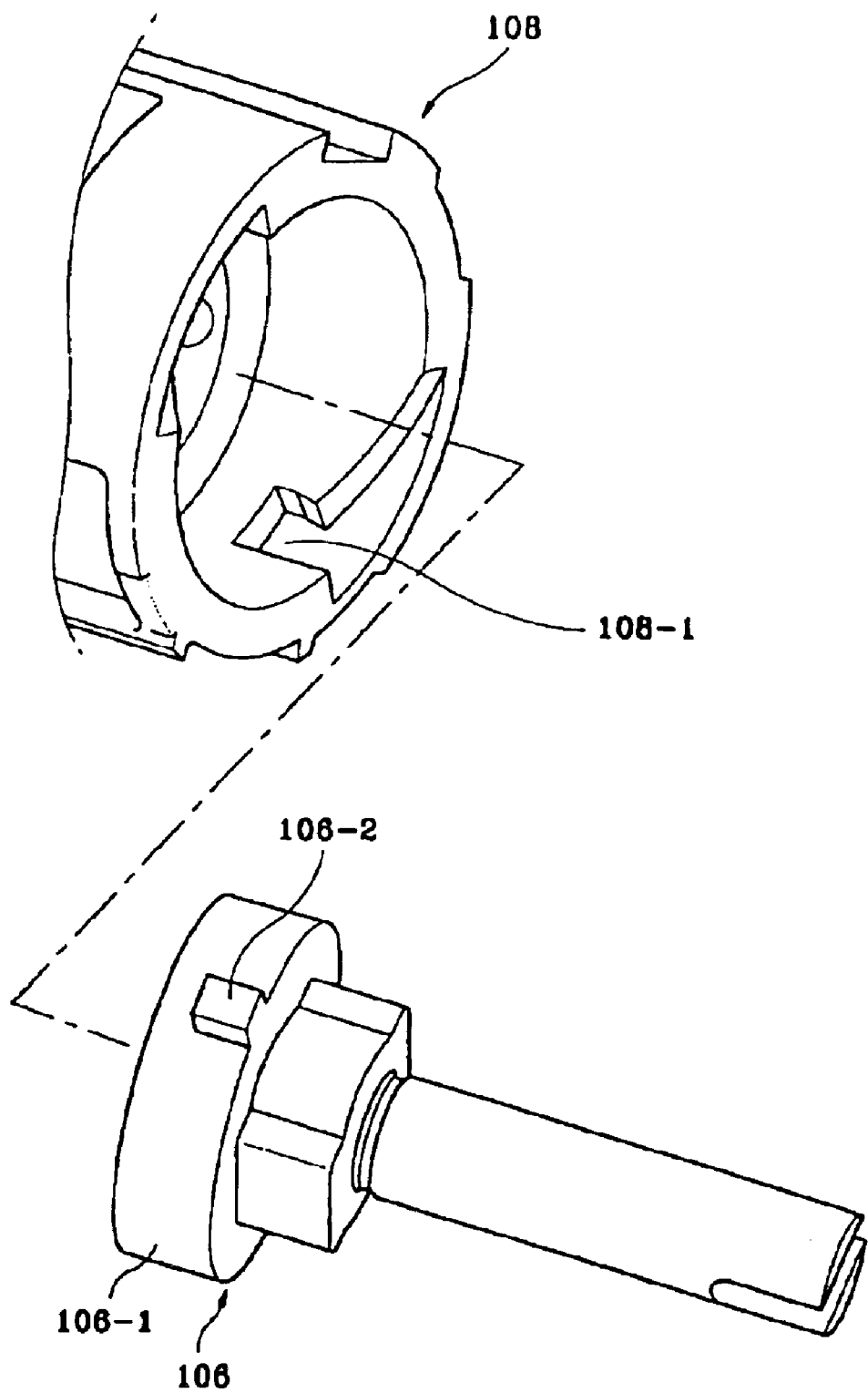
FIG. 3 shows the coupling between the locking part housing and the actuator of the locking device of FIG. 1.

FIG. 1 shows a general orientation of a steering shaft (S) and a steering column (C) of a vehicle configured with an ignition and steering locking device (L). FIG. 2 shows the locking device of FIG. 1 in greater detail. Shown is, an electromagnet 110, actuator 106, locking part housing 108, and the cylinder 104. Also shown in FIG. 2 is the positive and negative axial directions of referred to below for describing movement of different component parts. FIG. 3 shows one portion of the locking device of the present invention. The locking part housing 108 has locking slots 108-1 for receiving the locking protuberance 106-2 of the actuator 106. In use, when the actuator moves in a positive axial direction and the locking protuberance 106-2 engage the locking slots 108-1 the actuator is retained from rotation because the locking part housing 108 does not rotate.

Figure 4:
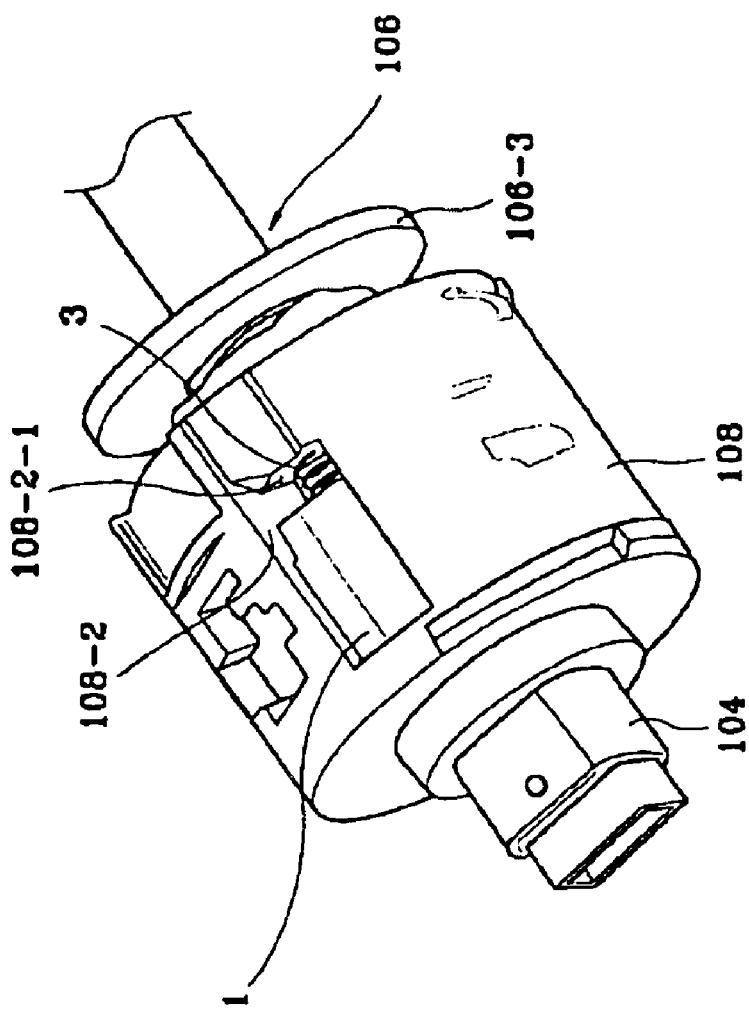
FIG. 4 shows an embodiment of a locking block and a coil spring installed between the locking part housing and the actuator in an embodiment of the present invention.
Figure 5:
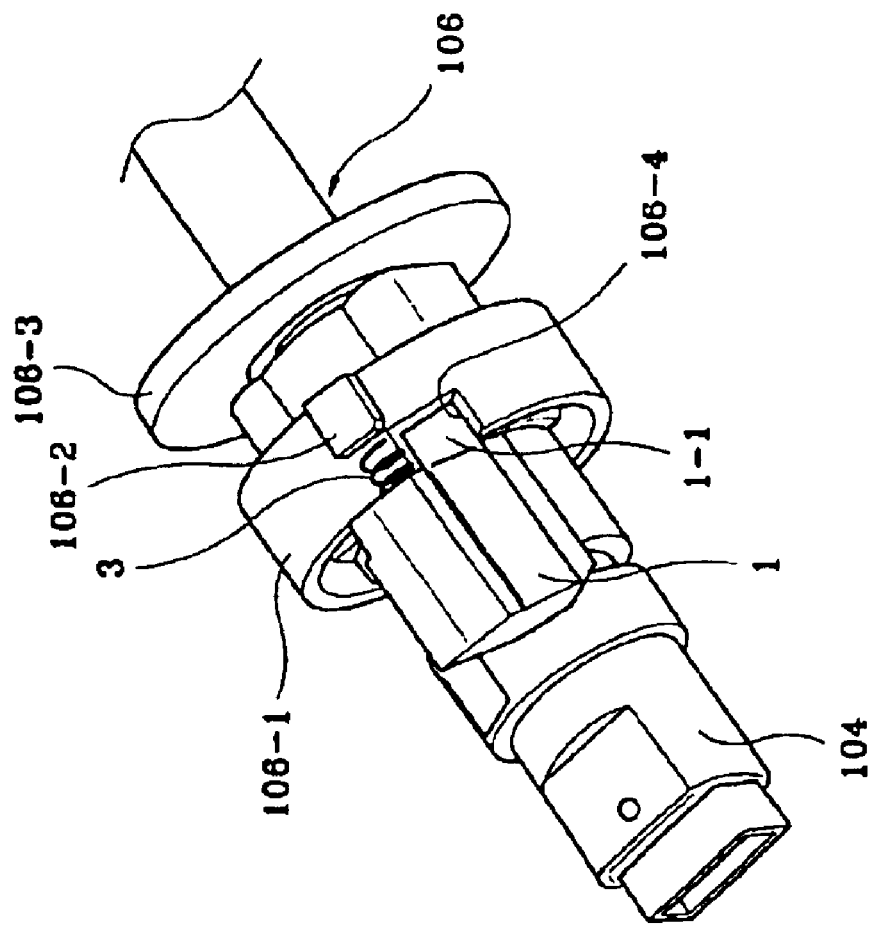
FIG. 5 shows the embodiment of FIG. 4 in which the locking part housing is removed.
Figure 6:
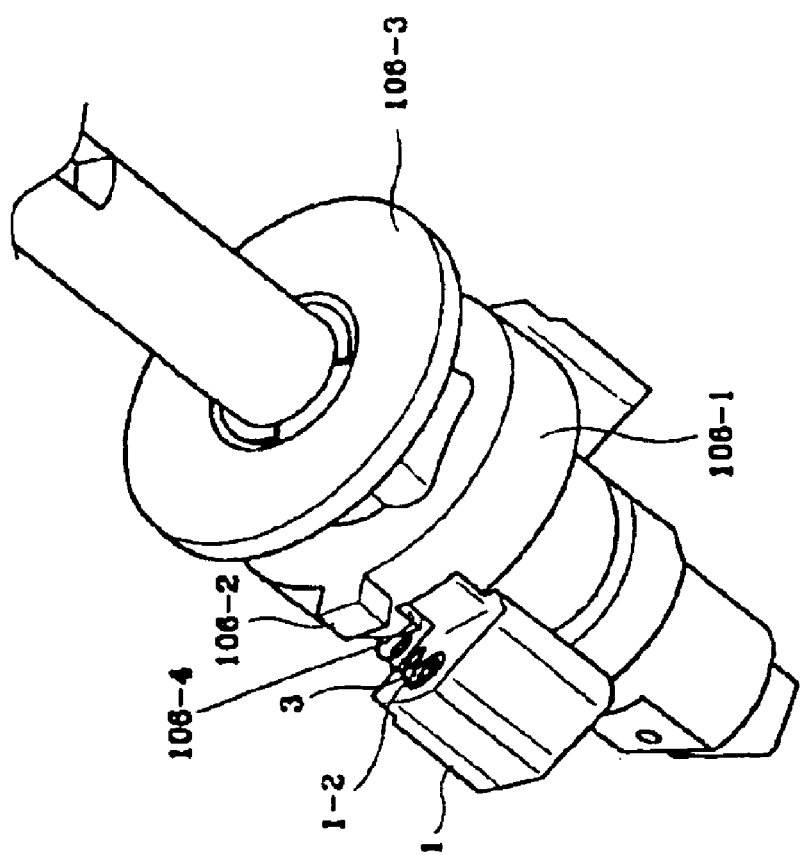
FIG. 6 shows the embodiment of FIG. 5 but from a different angle.

Referring to FIGS. 4 to 6 a locking device is shown in accord with an embodiment of the present invention. In a preferred embodiment the burglarproof locking device includes a locking block 1 axially and slidably installed within a locking part housing 108. The locking block 1 is inhibited from rotation and inhibits rotation of an actuator 106 following axial movement of the locking block 1 into a locking position. The device further includes an elastic member (described below) for elastically supporting the locking block 1. The elastic member also functions to separate the locking block from the actuator 106, thereby allowing the actuator 106 to rotate.

FIG. 3 shows other locking components of an embodiment of the present invention. The locking part housing 108 has locking slots 108-1. The locking slots 108-1 are configured to receive the locking protuberance 106-2 of the actuator 106. The insertion and removal of the actuator 106 into and out of the locking part housing 108 is varied by the magnetic force of an electromagnet 110 (FIG. 2) and the elastic force of a spring (not shown). Thus, rotation of the actuator 106 relative to the locking part housing 108 can be altered between no rotation and free rotation.

The locking block 1 is preferably made of a material, which is attracted by a magnetic force. The locking part housing 108 is provided with a guide channel 108-2 so that the locking block 1 can perform linear movements in the axial direction. The locking block 1 is provided with a locking block protuberance 1-1 projecting toward the actuator 106, while the actuator 106 is provided with a locking block slot 106-4 for receiving the locking block protuberance 1-1. The elastic member comprises a coil spring 3 which is installed between the locking block 1 and a negative axial direction support face 108-2-1 of the guide channel 108-2.

A spring securing slot 1-2 is provided on the locking block 1. The spring securing slot 1-2 receives a part of the coil spring 3, such that the coil spring 3 is held secure and maintained between the locking block 1 and the guide channel 108-2. According to FIG. 4, a slot or protuberance is formed on the negative axial direction support face 108-2-1, opposite to the spring securing slot 1-2 (FIG. 6), so that the coil spring 3 is held in a stable position.

In a preferred embodiment of the present invention, the locking block 1 and the coil spring 3 are installed as a pair, respectively, around the circumference of the locking part housing 108. In an alternative embodiment, there is a plurality of locking blocks 1 and coil springs 3. The plurality increases the functioning and reliability of the locking device.

Figure 7:
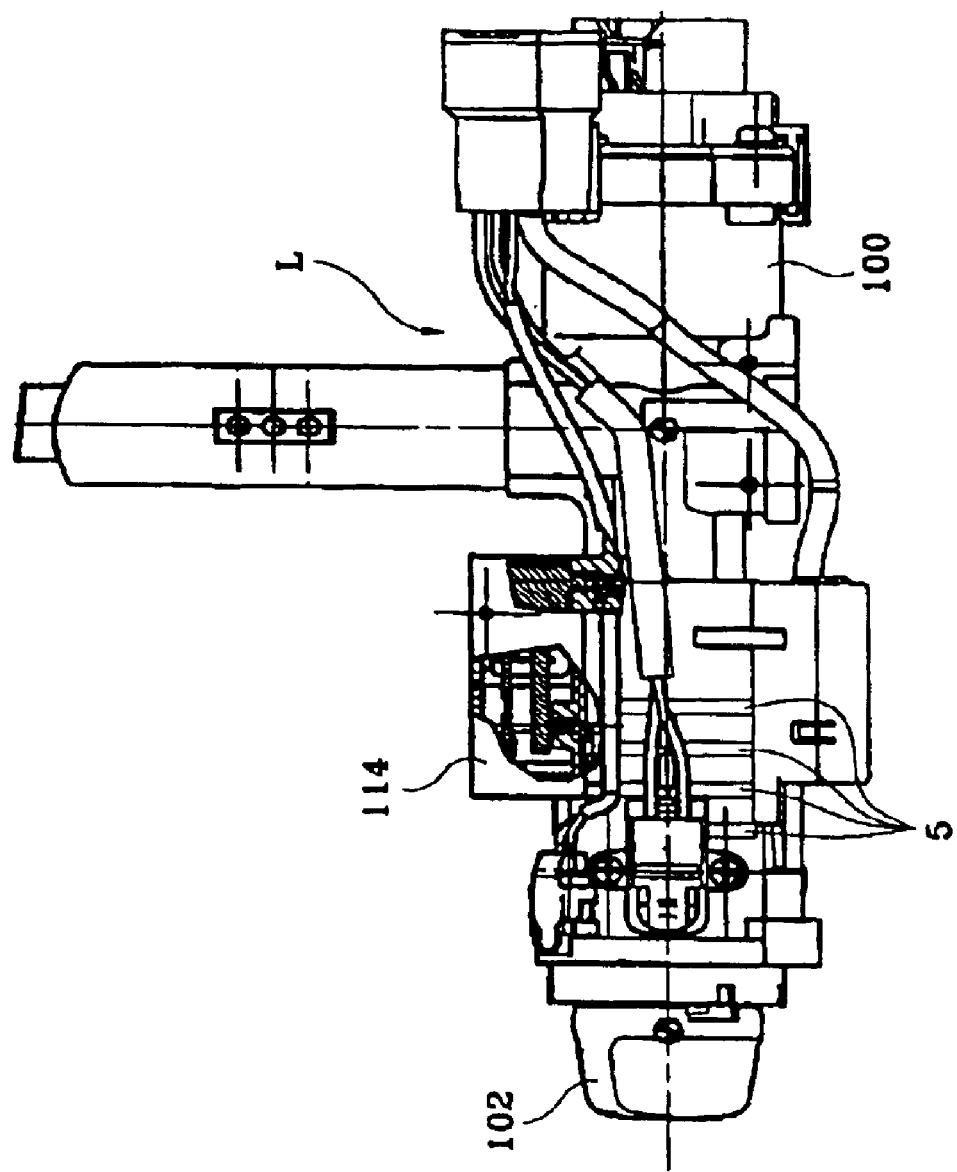
FIG. 7 shows an embodiment with space-ensuring ribs formed in the locking part housing according to an embodiment of the present invention.

The housing 100 forms the outer shell of the locking device, as shown in FIG. 7, a plurality of space-ensuring ribs 5 are provided on the outside perimeter near the portion where the plunger 106-3 and the electromagnet 110 are located. Thus, the application of a foreign device, such as, a magnet to deactivate the locking device can be prevented. The application of a strong magnet, for imitating the function of the electromagnet, is structurally blocked.

Functionally, the locking block 1 is elastically pushed by the coil spring 3 in the positive axial direction. The actuator 106 is pushed in the positive axial direction by a spring (not shown). Therefore, the locking protuberance 106-2 lock with the locking slots 108-1 and the locking block protuberance 1-1 lock with the locking block slot 106-4 preventing the actuator 106 from being rotated.

In use, if a controller (not illustrated) determines that the user is authorized, then the controller causes a solenoid controller 114 to activate the electromagnet 110. The electromagnet 110 attracts the plunger 106-3 which moves the actuator 106 in the negative axial direction, and the locking protuberance 106-2 departs from the locking slot 108-1 of the locking part housing. Furthermore, the locking block 1 is shaped and positioned such that the attractive force of the electromagnet 110 applied to the locking block 1 does not exceed the positive axial force on the locking block 1 applied by the spring 3. Therefore, the locking block protuberance 1-1 is withdrawn from the locking block slots 106-4 and the actuator 106 is free to rotate. Thus, the driver can turn the knob 102, which is connected through the cylinder 104 to the actuator 106, thereby obtaining the desired effect.

However, if an unauthorized person tries to turn the knob 102 by applying an impact or by using a strong magnet to move the actuator in the negative axial direction the locking device of the present invention remains locked. This is because the locking block 1 is shaped and positioned to be attracted by an externally applied magnetic force such that the positive axial force of the spring 3 applied to the locking block 1 will be overcome. Therefore, the locking block 1 moves in the negative axial direction with the actuator 106, maintaining the locked status of the actuator.

That is, if an external impact is applied sufficiently for the actuator 106 to compress the spring 112 to move in the negative axial direction, then the locking block 1 also compresses the spring 3 to move in the negative axial direction.

Thus, if the actuator 106 and the locking block 1 move together in the negative axial direction, then the locking block protuberance 1-1 of the locking block is kept inserted into the locking block slot 106-4, and therefore, the actuator is prevented from being rotated by the locking block 1.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A burglarproof locking device for a vehicle, comprising:
    a locking part housing forming a locking slot therein;
    an actuator with a locking protuberance formed thereon configured for mating into said locking slot;
    an electromagnet configured to move said actuator in a negative axial direction;
    a spring configured to move said actuator in a positive axial direction;
    a locking block axially slidably installed within said locking part housing configured to interlock said locking part housing with said actuator to inhibit rotation between said locking part housing and said actuator upon axial movement of said locking block; and
    an elastic member for elastically supporting said locking block to remotely separate it from said actuator.

2. The device of claim 1, wherein said locking part housing provides a guide channel for making said locking block linearly slide in an axial direction;
    the locking block is provided with a locking block protuberance projected toward said actuator; and
    the actuator is provided with a locking block slot for being mated with said locking block protuberance.

3. The device of claim 2, wherein said elastic member comprises a coil spring disposed between said locking block and a negative axial direction support face of said guide channel.

4. The device of claim 1, wherein said locking block defines a spring securing slot for receiving a part of said coil spring.

5. The device of claim 1, wherein plural locking blocks and elastic members are formed around a circumference of said locking part housing.

6. The device of claim 1, further comprising a plurality of space-ensuring ribs configured on said locking part housing at a position where said electromagnet and a plunger of said actuator are installed.

7. The device of claim 1, wherein said locking block is made of a material attracted by magnetic forces.

8. A locking device for a vehicle, comprising:
    a locking block slidably biased in an axial direction by a first spring;
    an actuator configured for axial movement, slidably biased along the axial direction by a second spring and defining a slot for receiving said locking block;
    a housing defining a channel for slidably receiving said locking block wherein said locking block is inhibited from rotation within said housing and wherein said housing is configured to rotatably lockably receive said actuator;
    an electromagnet configured to axially slidably attract said actuator against said second spring; and wherein a force of the first spring applied to the locking block is greater than the force applied to the locking block by the electromagnet.

9. The device of claim 8, wherein said locking block is constructed of a ferrous material.

10. The device of claim 8, further comprising a plurality of said locking blocks and said channels for receiving said locking blocks in said housing.

11. The device of claim 8, further comprising a plurality of ribs disposed on an external housing of the locking device near said actuator and locking block.

12. A locking device for a vehicle, comprising:

a locking part housing formed around a longitudinal axis with an open end facing a negative axial direction;

a locking slot defined in the open end of the locking part housing;

an actuator biased in a positive axial direction with a locking protuberance configured for mating into said locking slot;

an electromagnet configured to move said actuator in a negative axial direction;

a locking block axially slidably installed within said locking part housing configured to interlock said locking part housing with said actuator to inhibit rotation therebetween upon said locking block being moved in the axial direction; and an elastic member for elastically supporting said locking block to remotely separate it from said actuator.

13. The device of claim 12, further comprising:

an axial guide channel defined in said locking part housing for linearly slidably receiving said locking block;

a protuberance projecting from the locking block in the direction of the actuator; and a locking block slot defined by the actuator for receiving and mating with the locking block protuberance.

* * * * *